United States Patent
Vedula et al.

(10) Patent No.: US 10,805,965 B2
(45) Date of Patent: Oct. 13, 2020

(54) METHOD AND APPARATUS FOR CONTROLLING CONTENT SHARED BETWEEN DEVICES IN WIRELESS COMMUNICATION SYSTEM

(71) Applicant: Samsung Electronics Co., Ltd., Gyeonggi-do (KR)

(72) Inventors: Kiran Bharadwaj Vedula, Bangalore (IN); Jun-Hyung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/308,163

(22) Filed: Jun. 18, 2014

(65) Prior Publication Data
US 2014/0372620 A1 Dec. 18, 2014

(30) Foreign Application Priority Data

Jun. 18, 2013 (IN) .......................... 2645/CHE/2013
Apr. 28, 2014 (IN) .......................... 2645/CHE/2013

(51) Int. Cl.
*G06F 15/16* (2006.01)
*H04W 76/10* (2018.01)
(Continued)

(52) U.S. Cl.
CPC ......... *H04W 76/10* (2018.02); *H04L 65/1069* (2013.01); *H04L 65/4092* (2013.01);
(Continued)

(58) Field of Classification Search
CPC ..... H04L 67/38; H04L 29/08; H04L 65/1069; H04L 65/4092; H04L 65/608;
(Continued)

(56) References Cited

U.S. PATENT DOCUMENTS 7,356,848 B1   4/2008  Duffield et al.
8,774,536 B1 * 7/2014  Jia ..................... G06K 9/00979
                                                    382/232
(Continued)

FOREIGN PATENT DOCUMENTS

EP    2 801 180      11/2014
JP    2012-198675    10/2012
(Continued)

OTHER PUBLICATIONS

English Translation of JP 2012-198675.*
(Continued)

*Primary Examiner* — Michael Won
*Assistant Examiner* — Karina J Garcia-Ching
(74) *Attorney, Agent, or Firm* — The Farrell Law Firm, P.C.

(57) ABSTRACT

Methods and apparatuses are provided for sharing contents with a sink device in a wireless communication system. A first set of information is received from at least one sink device. A connection is established to the at least one sink device based on the first set of information. Capability information of the at least one sink device is received. A second set of information related to the capability information is sent to the at least one sink device.

19 Claims, 7 Drawing Sheets

(51) Int. Cl.
  *H04L 29/08* (2006.01)
  *H04L 29/06* (2006.01)
  *G06F 3/14* (2006.01)
(52) U.S. Cl.
  CPC ............ *H04L 65/608* (2013.01); *H04L 67/14* (2013.01); *H04L 67/16* (2013.01); *H04L 69/24* (2013.01); *G06F 3/1454* (2013.01)
(58) Field of Classification Search
  CPC ......... H04L 67/16; H04L 67/14; H04L 69/24; H04W 76/10; G06F 3/1454
  USPC ........................................................ 709/228
  See application file for complete search history.

(56) References Cited

U.S. PATENT DOCUMENTS

| | | | | |
|---|---|---|---|---|
| 9,013,513 | B2* | 4/2015 | Paolini | G06F 3/0483 345/672 |
| 2007/0220562 | A1 | 9/2007 | Janssen et al. | |
| 2011/0191695 | A1 | 8/2011 | Dinka et al. | |
| 2011/0283334 | A1 | 11/2011 | Choi et al. | |
| 2013/0009873 | A1 | 1/2013 | Huang et al. | |
| 2013/0009887 | A1* | 1/2013 | Huang | H04L 65/4092 345/173 |
| 2013/0033496 | A1* | 2/2013 | Raveendran | G06F 3/1407 345/428 |
| 2013/0139210 | A1 | 5/2013 | Huang et al. | |
| 2013/0141517 | A1 | 6/2013 | Shen et al. | |
| 2013/0179029 | A1* | 7/2013 | Wang | H04L 65/4092 701/32.7 |
| 2013/0238702 | A1* | 9/2013 | Sheth | H04L 67/38 709/204 |
| 2013/0282914 | A1 | 10/2013 | Jeong et al. | |
| 2014/0040959 | A1* | 2/2014 | Oyman | H04N 21/6131 725/62 |

FOREIGN PATENT DOCUMENTS

| | | |
|---|---|---|
| JP | 2012198675 A * | 10/2012 |
| KR | 1020110125724 | 11/2011 |
| KR | 1020120073150 | 7/2012 |
| WO | WO 2013/103726 | 7/2013 |

OTHER PUBLICATIONS

European Search Report dated Jan. 13, 2017 issued in counterpart application No. 14814529.5-1853, 13 pages.
Wi-Fi Alliance: Wi-Fi Alliance Technical Committee, Wi-Fi Display Technical Task Group, Wi-Fi Display Technical Specification Version 1.0.0, Jan. 1, 2012, 149 pages.
Wi-Fi Alliance: Wi-Fi Certified Miracast (TM): Extending the Wi-Fi Experience to Seamless Video Display, Internet Citation, Sep. 19, 2012, 18 pages.
European Search Report dated Nov. 14, 2017 issued in counterpart application No. 14814529.5-1853, 14 pages.
Summons to Attend Oral Proceedings dated Apr. 4, 2019 issued in counterpart application No. 14814529.5-1213, 15 pages.
Korean Office Action dated Jun. 15, 2020 issued in counterpart application No. 10-2014-0074059, 11 pages.

* cited by examiner

METHOD AND APPARATUS FOR CONTROLLING CONTENT SHARED BETWEEN DEVICES IN WIRELESS COMMUNICATION SYSTEM

PRIORITY

This application claims priority under 35 U.S.C. § 119(a) to Indian Provisional Application No. 2645/CHE/2013 filed on Jun. 18, 2013, and Indian Complete Application No. 2645/CHE/2013 filed on Apr. 28, 2014, the contents of which are incorporated herein by reference.

BACKGROUND OF THE INVENTION

1. Field of the Invention

The present invention relates generally to a wireless communication system, and more particularly, to a method and an apparatus for providing display sharing between devices in a wireless communication system.

2. Description of the Related Art

The Wireless Fidelity (Wi-Fi) Display (WFD) standard has been defined based on a requirement to transmit Audio/Video (A/V) data while satisfying demands for high quality and low latency. A WFD network employing the WFD standard is a network system suggested by the Wi-Fi Alliance that enables Wi-Fi devices to be connected to each other in a peer-to-peer fashion without participating in a home network, an office network, or a hot-spot network. WFD devices within a WFD network may be capable of discovering information regarding each other such as, for example, information on each other's capabilities, information on establishing a WFD session, and information on rendering content received during the WFD session.

The WFD network includes two types of devices, for example, a source device and a sink device. The source device mirrors data present on the source device's screen onto the sink device's screen. The source device and the sink device exchange a first sequence message with each other to perform device discovery and service discovery procedures. After the device discovery and service discovery procedures are completed, the source device and sink device are each assigned a respective Internet Protocol (IP) address. Further, a Transmission Control Protocol (TCP) connection is established between the source device and the sink device, and then Real Time Streaming Protocol (RTSP) and Real Time Protocol (RTP) stacks on the source device and the sink device are activated.

The capability negotiation procedure between the source device and the sink device is performed over RTSP, and the source device and the sink device exchange M1 to M4 messages in the process of performing the capability negotiation procedure. Subsequently, the source device and the sink device exchange WFD session control messages. In addition, a data session over RTP is established between the source device and the sink device.

However, the specification of currently used WFD devices is limited to a single source device and a single sink device, and data on a source device's screen is completely mirrored onto a sink device's screen without any control. For example, when the user of a laptop projects the laptop screen onto a bigger WFD device (sink device) in a meeting room, the user may not wish the entire laptop screen to be displayed on the sink device's screen, or when a teacher is to mirror some data onto students' devices at school, the teacher may want to control what content is displayed and what content is not displayed to the screens of the students' devices.

SUMMARY OF THE INVENTION

The present invention has been made to address at least the above problems and/or disadvantages and to provide at least the advantages described below. Accordingly, an aspect of the present invention provides a method and apparatus for controlling content shared between devices in a wireless communication system.

According to an aspect of the present invention, a method of a source device is provided for sharing contents with a sink device in a wireless communication system. A first set of information is received from at least one sink device. A connection is established to the at least one sink device based on the first set of information. Capability information of the at least one sink device is received. A second set of information related to the capability information is sent to the at least one sink device.

According to another aspect of the present invention, a source device is provided for sharing contents with a sink device in a wireless communication system. The source device includes a receiver configured to receive a first set of information from at least one sink device, and to receive capability information of the at least one sink device. The source device also includes a controller configured to establish a connection to the at least one sink device based on the first set of information. The source device further includes a transmitter configured to send a second set of information related to the capability information to the at least one sink device.

According to an additional aspect of the present invention, a method of a sink device is provided for sharing contents with a source device in a wireless communication system. A first set of information is sent to the source device. A connection to the source device is established based on the first set of information. Capability information of the sink device is sent to the source device. A second set of information related to the capability information is received from the source device.

According to a further aspect of the present invention, a sink device is provided for sharing contents with a source device in a wireless communication system. The sink device includes a transmitter configured to send a first set of information to the source device, and to send capability information of the sink device to the source device. The sink device also includes a controller configured to establish a connection to the source device based on the first set of information. The sink device further includes a receiver configured to receive a second set of information related to the capability information from the source device.

According to another aspect of the present invention, a system is provided for control content between devices in wireless communication system. The system includes a source device configured to exchange a first set of information and capability information with at least one sink device, establish a connection to the at least one sink device, and send a second set of information to the at least one sink device. The system also includes the at least one sink device configured to exchange the first set of information and the capability information with the source device, establish the connection to the source device, and receive a second set of information from the source device.

Additionally, according to an aspect of the present invention, an article of manufacture is provided for sharing contents in a wireless communication system, including a machine readable medium containing one or more programs which when executed implement the steps of: receiving a first set of information from at least one sink device; establishing a connection to the at least one sink device based on the first set of information; receiving capability information of the at least one sink device; and sending a second set of information related to the capability information to the at least one sink device.

According to a further aspect of the present invention, an article of manufacture is provided for sharing contents in a wireless communication system, including a machine readable medium containing one or more programs which when executed implement the steps of: sending a first set of information to a source device; establishing a connection to the source device based on the first set of information; sending capability information of the sink device to the source device; and receiving a second set of information related to the capability information from the source device.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
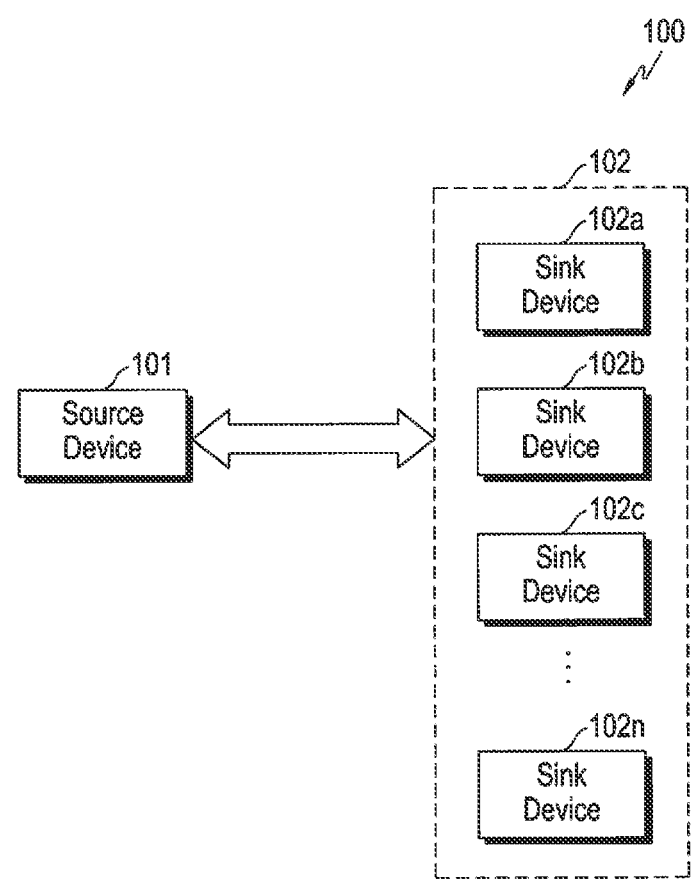
FIG. 1 is a block diagram illustrating a configuration of a system for controlling content shared between WFD devices, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The specification may refer to "an", "one" or "some" embodiment(s) in several locations. This does not necessarily imply that each such reference is made to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising", when used in this specification, specify the presence of stated features, integers, steps, operations, elements, and/or components, but do not preclude the presence or addition of one or more other features integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include the meaning of being operatively connected or coupled. As used herein, the term "and/or" includes any and all combinations and arrangements of one or more of the associated listed items.

Unless otherwise defined herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a configuration of a system for controlling content shared between WFD devices, according to an embodiment of the present invention.

Referring to FIG. 1, a system 100 includes one source device 101 and one or more sink devices 102, that is, sink devices 102a, 102b, 102c . . . 102n.

In embodiments of the present invention described in greater detail below, a description is provided of a method and an apparatus for controlling content shared between two or more WFD devices in a WFD environment. Further, it will be assumed that a WFD session is established between the source device 101 and the one or more sink device 102, where the source device provides content and the sink device consumes the content.

In a system including the one source device 101 and one sink device 102, a unicast display session is established between the source device 101 and the sink device 102. Further, in a system including the one source device 101 and multiple sink devices 102, the source device 101 establishes a single multicast display session with all of the sink devices 102, establishes multiple unicast display sessions with each of the sink devices 102, or establishes different multicast display sessions with groups of the sink devices 102.

In the case of a multicast display session, the sink devices 102 should manage the state of the session by using local buffers. Contrarily, in the case of multiple unicast sessions, the source device 101 may manage the session states of different streams with each of the sink devices 102. The idea of controlling content shared between WFD devices in a wireless communication system, according to an embodiment of the present invention, may be applied in both the cases of multiple sink devices and one sink device. As used in embodiments of the present invention, the terms 'system' and 'apparatus' may be used interchangeably.

In order to control content shared between WFD devices, the system 100 of FIG. 1 includes a means for exchanging a first set of information between a source device and at least one sink device, a means for establishing a connection between a source device and at least one sink device, a means for exchanging capability information between a source device and at least one sink device, and a means for sending a second set of information from a source device to at least one sink device. The means for performing the above-mentioned steps include one or more processors included in at least one of a source device and a sink device.

The first set of information includes, but is not limited to, device discovery information, service discovery information, and the like. The second set of information includes, but is not limited to, display coordinates, context setting, lock and unlock settings, user pre-configuration, user post-configuration, and/or the like.

A wireless communication system, according to an embodiment of the present invention, may include one source device and one sink device, and a unicast display session may be established between the source device and the sink device. The source device controls what information is displayed on the sink device's screen from time to time (even during an ongoing session), and this control operation is described in greater detail below with reference to FIG. 2.

Figure 2:
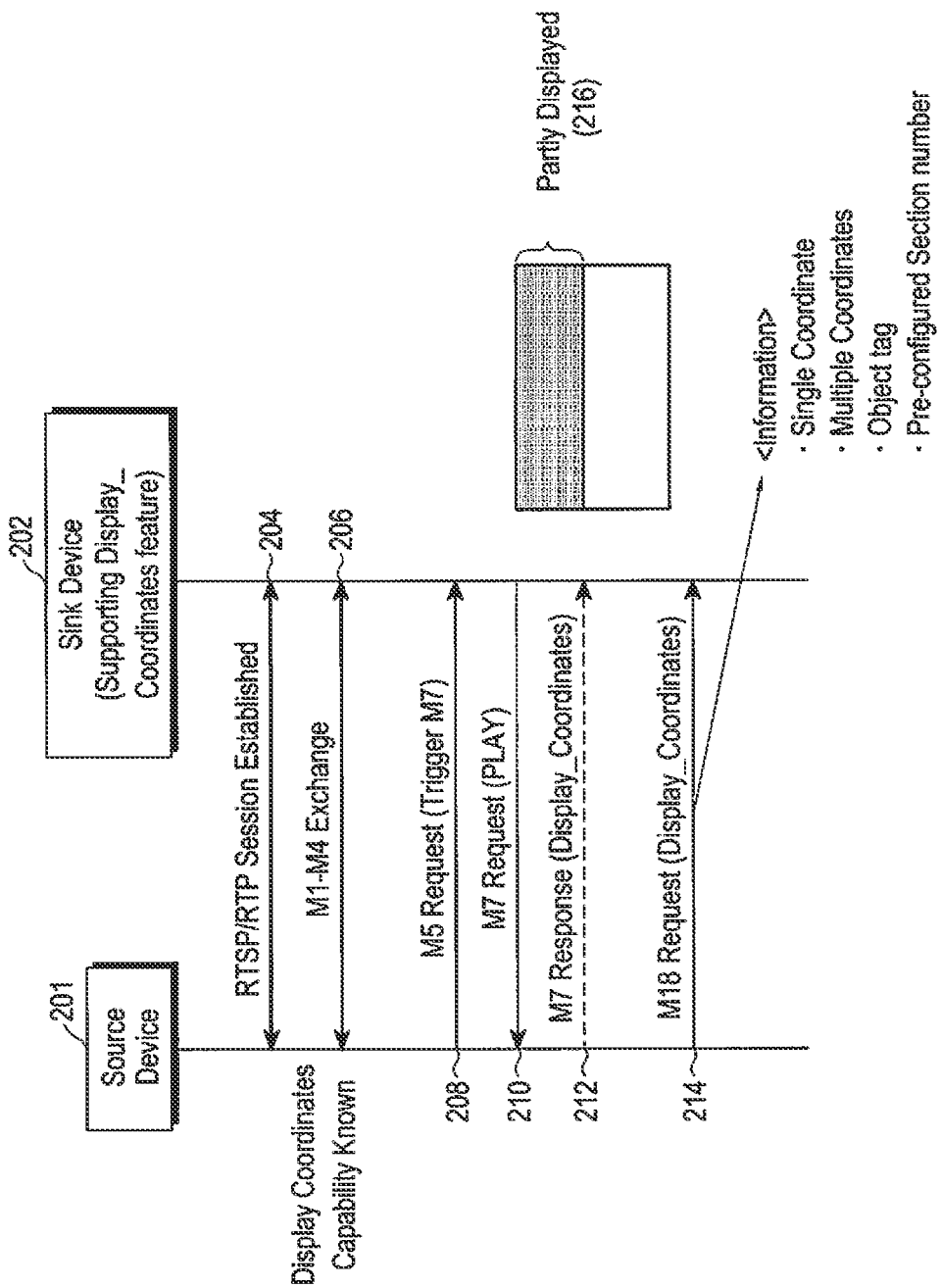
FIG. 2 is a signal flow diagram illustrating an exchange of messages for controlling content shared between WFD devices in a wireless communication system, according to an embodiment of the present invention.

FIG. 2 is a signal flow diagram illustrating an exchange of messages for controlling content shared between WFD devices, according to an embodiment of the present invention.

Referring to FIG. 2, it is assumed that the system shown in the drawing includes a source device 201 and a sink device 202.

An RTSP/RTP session is established between the source device 201 and the sink device 202, in step 204, and M1 to M4 messages are exchanged between the source device 201 and the sink device 202, in step 206. The message exchange in step 206 includes exchanging capability information between the source device 201 and the sink device 202. Using an M3 request message, the source device 201 knows if the sink device 202 supports a "display coordinates" feature. Only when the sink device 202 supports the "display coordinates" feature does the source device 201 initiate a session including display coordinates. If the "display coordinates" feature is not supported, the source device 201 does not initiate a session including display coordinates with a specific sink device or a group of sink devices.

Once the RTSP session is active on both the source device 201 and the sink device 202, the source device 201 sends an M5 request message to the sink device 202, which triggers an M7 request message, in step 208.

The sink device 202 then sends an M7 request message to the source device 201 in response to the M5 request message to start playing content on the screen of the sink device 202, in step 210. The sink device 202 receives "Display_Coordinates", along with an M7 response message, from the source device 201, in step 212.

The sink device 202 interprets the "Display_Coordinates", and based on the result of the interpretation, displays only a part of the content sent from the source device 201 on the screen, in step 216.

Based on some inputs, the source device 201 sends an M18 request (RTSP announce request) message to the sink device 202, which makes a request for updating the ongoing RTSP session parameters, in step 214. The M18 request message carries "Display_Coordinates", the value of which is different from that of the "Display_Coordinates" sent in step 212.

Although not shown, the sink device 202 updates the content displayed on the screen, based on the new coordinate information sent from the source device 201.

The "Display_Coordinates" parameters sent in steps 212 and 214 have different types of values, such as, for example, 1) Single Coordinate, 2) Multiple Coordinates, 3) Pre-Configured Section numbers, and 4) Object Tags.

Figure 3:
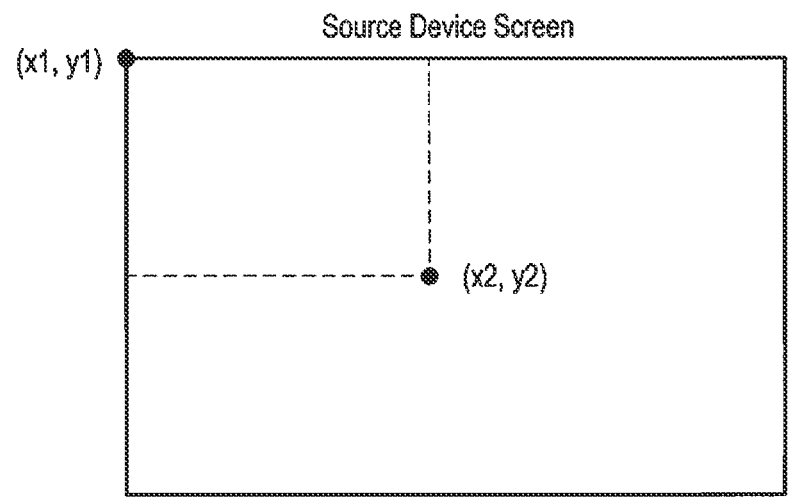
FIG. 3 is a view illustrating start and end coordinates that are displayed on a source device's screen in a wireless communication system, according to an embodiment of the present invention.

FIG. 3 illustrates start and end coordinates that are displayed on a source device's screen in a wireless communication system, according to an embodiment of the present invention.

Referring to FIG. 3, the single coordinate displayed on the source device's screen is represented by a combination of two coordinates, that is, the start coordinate (x1, y1) and the end coordinate (x2, y2). Both the start and end coordinates are represented using a tuple (x, y), which indicates the x coordinate and the y coordinate.

The value of the parameter is indicated as coordinates with respect to the top left corner that is always assumed to be (0, 0), that is, the start coordinate and the end coordinate are assumed to be in the $3^{rd}$ quadrant mathematically.

Figure 4:
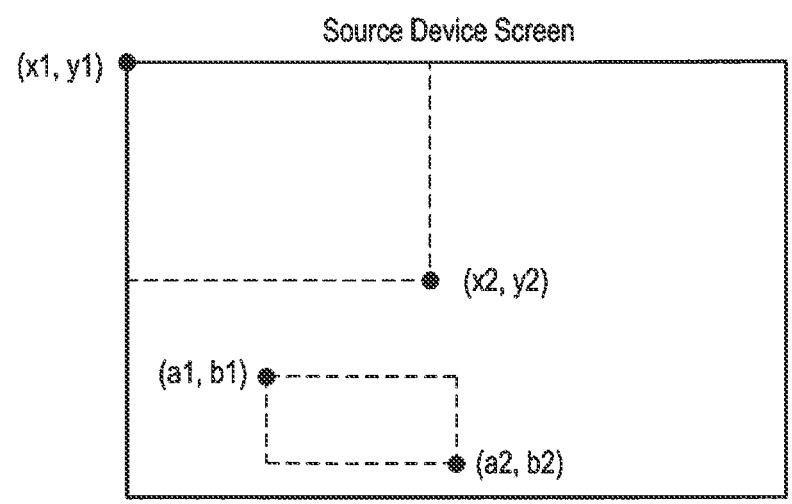
FIG. 4 is a view illustrating sets of start and end coordinates that are displayed on a source device's screen in a wireless communication system, according to an embodiment of the present invention.

FIG. 4 illustrates sets of start and end coordinates that are displayed on a source device's screen in a wireless communication system, according to an embodiment of the present invention.

Referring to FIG. 4, the multiple coordinates displayed on the source device's screen represent multiple sets of single coordinates. In FIG. 4, (x1, y1) and (x2, y2) represent one set of coordinates, and (a1, b1) and (a2, b2) represent another set of coordinates.

The value of the parameter is indicated as coordinates with respect to the top left corner that is always assumed to be (0, 0), that is, the start coordinate and the end coordinate are assumed to be in the $3^{rd}$ quadrant mathematically.

Figure 5:
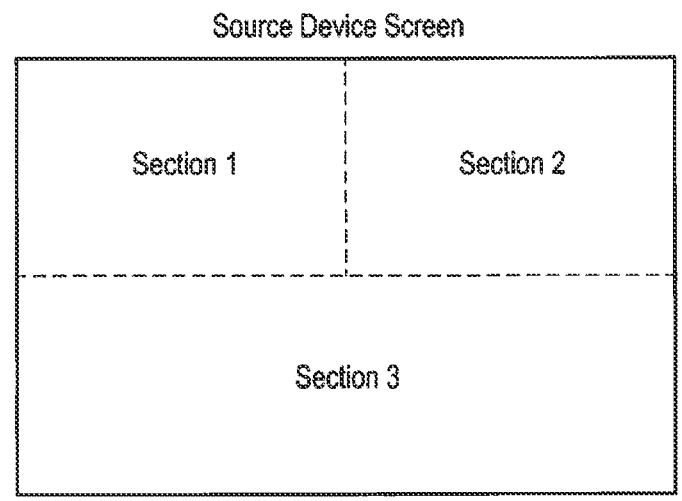
FIG. 5 is a view illustrating a source device's screen that is divided into a plurality of sections in a wireless communication system, according to an embodiment of the present invention.

FIG. 5 illustrates a source device's screen that is divided into a plurality of sections in a wireless communication system, according to an embodiment of the present invention.

Referring to FIG. 5, the source device's screen is pre-configured to be divided into certain sections, for example, section 1, section 2, and section 3, and each section is given a unique identifier. Further, the section number is indicated using a "Display_Coordinates" parameter.

Figure 6:
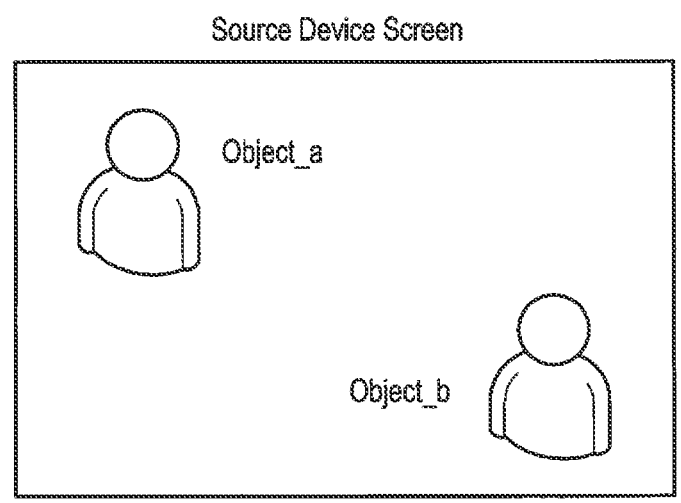
FIG. 6 is a view illustrating a source device's screen that includes different objects and tags associated with the different objects in a wireless communication system, according to an embodiment of the present invention.

FIG. 6 illustrates a source device's screen including different objects and tags associated with the different objects in a wireless communication system, according to an embodiment of the present invention.

Referring to FIG. 6, as in the case of MPEG-7, each object in the source device's screen is indicated using an object identifier. Information on the object identifier may be sent from the source device's screen to a sink device's screen by using a "Display_Coordinates" parameter.

A wireless communication system, according to another embodiment of the present invention, may include one source and multiple sink devices, and either multiple unicast display sessions or a single multicast display session may be established between the source device and the sink devices. The source device informs the sink devices during the capability negotiation procedure whether the source device has the capability to support multiple unicast display sessions or the capability to support a single multicast display session.

When multiple unicast display sessions are established between the source device and each sink device, an operation for controlling content shared between WFD devices is the same as that described above with respect to one source device and one sink device, except for certain features. That is, the control operation in this case is different from that of the system including one source device and one sink device only in that there are multiple sessions between the source device and the sink devices and the source device handles each session independently.

Further, the source device determines what value of a "Display_Coordinates" parameter is sent to the sink device. A particular "Display_Coordinates" parameter sent to the sink device from the source device may depend on its interactions with other sink devices. The source device may also control what information is displayed on the sink devices' screens from time to time (even during an ongoing session).

Figure 7:
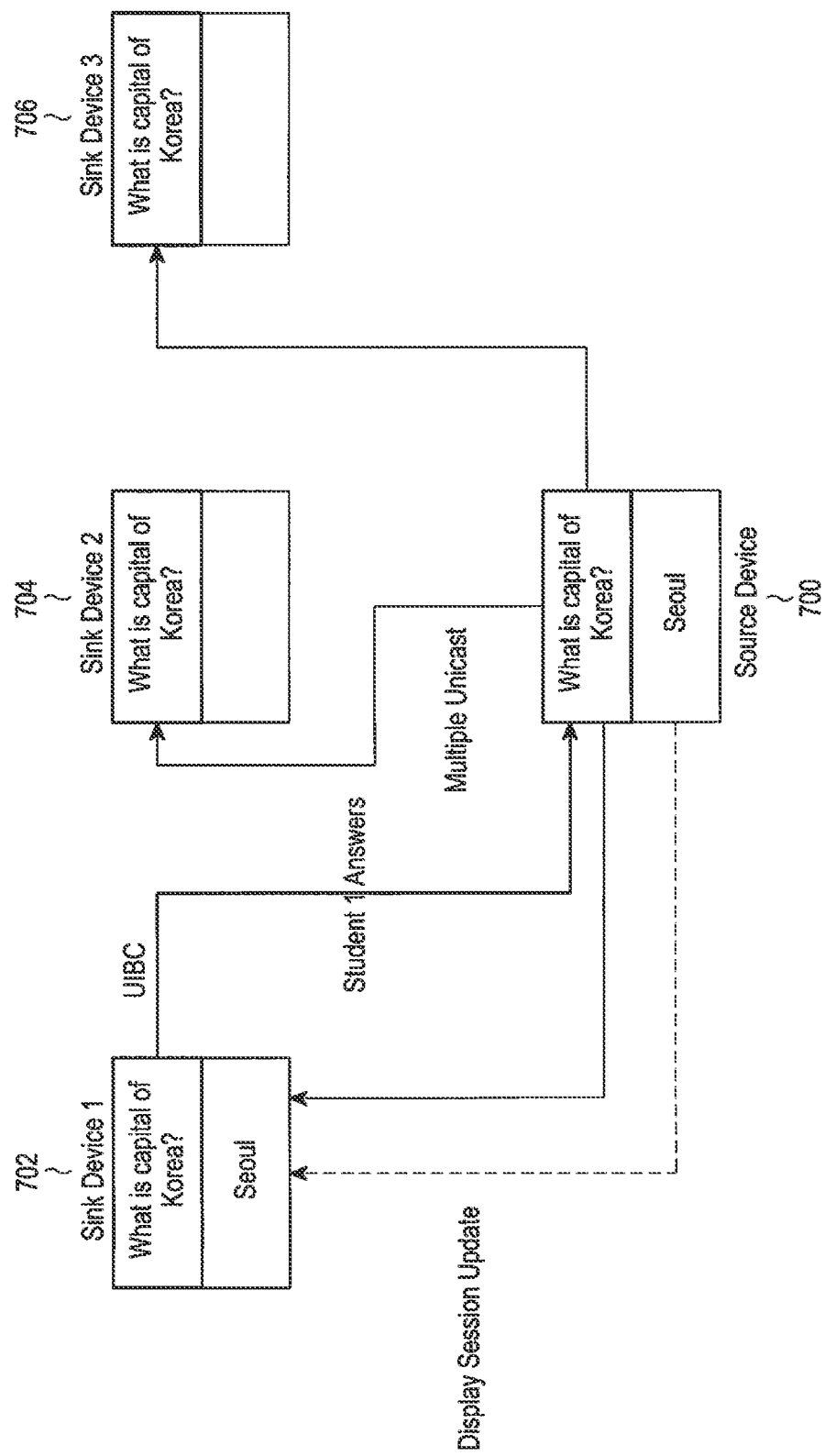
FIG. 7 is a flow diagram illustrating an exchange of messages for controlling content shared between WFD devices in a wireless communication system, according to another embodiment of the present invention.

FIG. 7 illustrates an exchange of messages for controlling content shared between WFD devices in a wireless communication system, according to another embodiment of the present invention.

Referring to FIG. 7, it is assumed that a source device 700 establishes unicast display sessions with sink device 1 702, sink device 2 704, and sink device 3 706. It is also shown in FIG. 7 that one of the multiple unicast display sessions is updated based on a back channel input from one of the sink devices 702, 704, 706.

When a single multicast display session is established between a source device and multiple sink devices, the source device multicasts session data on a previously known IP address and port. The sink devices get the multicast data from the previously known IP address and port by joining the multicast group. In the multicast case, an RTSP may be emulated by each sink device maintaining its own buffer. Thus, the source device effectively sends the same data to all the sink devices, and the sink devices internally manage trick modes like Play, Pause, Stop, etc. without affecting the multicast data session. The source device may also maintain multiple multicast display sessions. All of these sessions run on the previously known IP address and port. The sink devices may join any of the multicast groups.

Based on what part of the source device's screen is mirrored onto the sink device's screen, the source device makes different streams of the content for each multicast group. Each stream has a different "Display_Coordinates" parameter value. During an ongoing multicast display session, the source device may change the value of the parameter. The sink devices interpret the "Display_Coordinates" parameter even in the multicast display session and display only limited parts of the source device's screen on the sink device's screen.

For multicast streaming, the source devices may also apply an additional security mechanism. Therefore, the sink devices that are authorized to receive a particular multicast stream will be able to join that particular multicast stream. If a sink device is not authorized to receive a particular multicast stream, then the sink device will not be able to join that stream. Accordingly, no data will be displayed on the sink device's screen.

An embodiment of the present invention is aimed at identifying which part of a source device's screen is displayed on a sink device's screen by using the coordinates of content data displayed on the source device's screen. The identified coordinate information is sent to the sink device as a parameter in an RTSP play request message. Thus, the complete data is sent from the source device to the sink device. The sink device interprets the coordinate information sent from the source device and displays the data on the sink device's screen accordingly. Alternatively, partial content data may be sent from the source device to the sink device as per the coordinates selected by the user on the source device's screen.

The values of the coordinates parameters may be updated anytime in the source device and the corresponding content may be displayed dynamically on the sink device's screen. The values of the coordinates parameters may also be changed during an ongoing media session. The source device authorizes a sink device before sharing content with that sink device. This authorization may be set at the user level or may also be set automatically by secret based authorization shared between the source device and the sink device. Thus, in an embodiment of the present invention, handling malicious sink devices using the information received from the source device is avoided. Further, in an embodiment of the present invention, both multicast and unicast display sessions are controlled. Therefore, in the process of the multicast display session, the source device supports multiple multicast sessions with the sink devices.

According to an embodiment of the present invention, only a part of the source device's screen is mirrored to the sink device. Thus, the source device or users of the source device have control over what needs to be displayed on the sink device's screen, that is, the source device or users of the source device can choose which content is to be displayed on the sink device's screen. Also, any ongoing display session may be updated with new coordinate information to be used for mirroring only a part of the source device's screen to the sink device.

Accordingly, a Miracast session between a source device and a sink device generally does not include additional parameters for display configuration, but in an embodiment of the present invention, a system is described, which is further configured to control content shared between a sink device and at least one sink device. The Miracast refers to the intersection of wireless connectivity and a streamed audio/video content, and the display configuration includes 1) Context Setting (for example: Meeting Room, Children), 2) Lock and Unlock (for example: in case of Emergency), 3) User Pre-Configuration (for example: color, etc.), 4) Post-Configuration, and the like.

For example, a Miracast source device is more likely to be a mobile device, such as, for example, a smartphone or a tablet. The usage of a mobile device is not limited to a specific location, so the mobile device may be used in various contexts such as at home, in the office, in the presence of children, etc. It is also more likely that a sink device is a static device. A static device may maintain its context depending on where it is deployed. For example, a sink device in the office may be configured to be an office sink. Similarly, in the case of a TV viewed by children, parental guidance that configures the TV may be activated.

When associated contents are mirrored from source devices in specific contexts in this way, special care must be taken. For example, assuming that the mirroring is carried out in office environments, the audio level should not be so high as to disturb other people working in the office, and similarly, in the case of a TV viewed by children, certain types of video should not be played. These conditions are automatically applied depending on the context.

When a source device attempts to establish a Miracast session with a sink device, the sink device shares its context with the source device. The context is shared during the capability negotiation procedure by using an additional parameter "display_context", and the values configured for "display_context", for example, include "Office", "Home", "Parental Control", "Public", "Car", "Meeting", "Reserved", and the like.

Each value has a specified set of parameters like in the case of "Office", the audio is muted by default, and in the case of "Parental Control", the video metadata is checked to get the parental control information.

Content providers may make some content shareable across devices. This may vary depending on subscription information between users and service providers. For example, a user subscribed to a news scroll service on multiple devices can see the scroll on the sink device, but a user not subscribed to the news scroll service can see the scroll only on the source device and not on the sink device even when a Miracast session is running between the source device and the sink device. This type of option is made possible by dynamically locking and unlocking partial contents on the source device's screen. However, in the case of emergencies, it is possible to lift such a lock so that the sink device receives the emergency news scroll.

Further, the lock and unlock may be executed by a user on the sink device as well. That is, a user watching a TV may lock a part of the screen, such as a news scroll, and may display only the main media content such as a movie. By selecting such an option, the sink device indicates back to the source device not to send extra scroll information, which reduces the information sent over the air. Subsequently, if the user on the sink device unlocks the locked part and is to watch the scrolling content, then the source device is informed to send the complete data.

A sink device may be configured to view a video in a certain configuration using, for example, specific colors, horizontal or vertical display modes, lesser brightness, or the like. The source device is unaware of such a configuration. According to an embodiment of the present invention, the system is configured to provide such a configuration to the source device in order to optimize data and provide the optimized data to the sink device.

While a display session is running between a source and a sink device, all parameters for the display data channel are not changed in the previous version of the display. However, certain parameters like the configuration parameters may be changed without a major effect on the session. Accordingly, such a change in the configuration is to be allowed even in an ongoing Miracast session. Post-configuration allows for optimizing the usage of a bandwidth depending on need.

Figure 8:
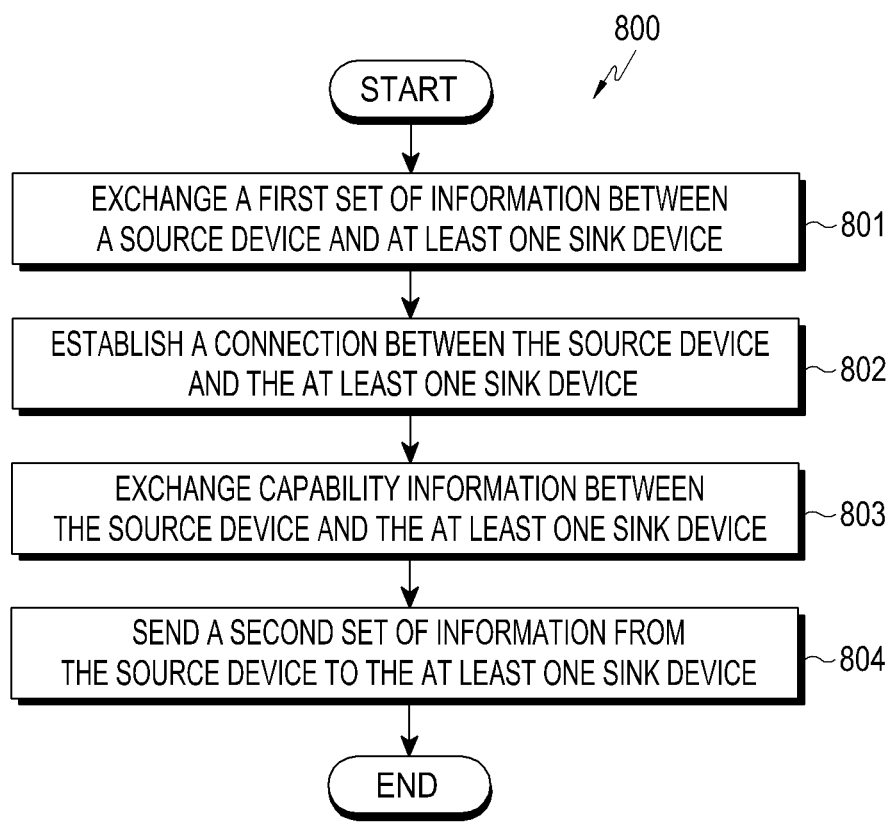
FIG. 8 is a flowchart illustrating a method for controlling content shared between WFD devices in a wireless communication system, according to an embodiment of the present invention.

FIG. 8 is a flowchart illustrating a method for controlling content shared between WFD devices in a wireless communication system, according to an embodiment of the present invention.

Referring to FIG. 8, in step 801, a source device exchanges a first set of information with at least one sink device. In step 802, the source device establishes a connection to the at least one sink device. In step 803, the source device exchanges capability information with the at least one sink device. In step 804, the source device sends a second set of information to the at least one sink device.

Figure 9:
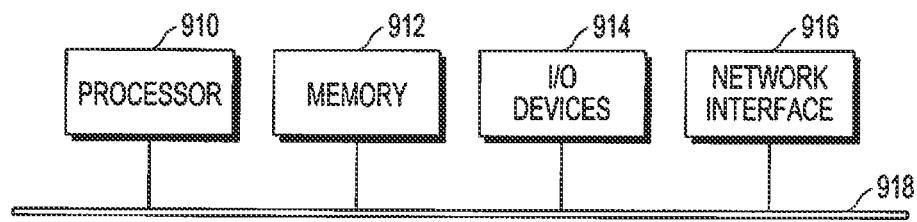
FIG. 9 is a block diagram illustrating a hardware implementation of a source device or a sink device, according to an embodiment of the present invention.

Referring now to FIG. 9, a block diagram illustrates a hardware implementation of a source device or a sink device in accordance with which one or more components/methodologies of the invention (e.g., components/methodologies described in the context of FIGS. 1-8) may be implemented. As shown, the device may be implemented in accordance with a processor 910, a memory 912, Input/Output (I/O) devices 914, and a network interface 916, coupled via a computer bus 918 or alternate connection arrangement.

It is to be appreciated that the term "processor" as used herein is intended to include any processing device, such as, for example, one that includes a Central Processing Unit (CPU), controller, and/or other processing circuitry. It is also to be understood that the term "processor" may refer to more than one processing device and that various elements associated with a processing device may be shared by other processing devices. The term "memory" as used herein is intended to include memory associated with a processor or CPU, such as, for example, Random Access Memory (RAM), Read Only Memory (ROM), a fixed memory device (e.g., hard drive), a removable memory device (e.g., diskette), flash memory, etc.

In addition, the phrase "I/O devices" as used herein is intended to include, for example, one or more input devices for entering information into the processing unit, and/or one or more output devices for outputting information.

Still further, the phrase "network interface" as used herein is intended to include, for example, one or more transceivers to permit the device to communicate with another device via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

While the present invention has been described with reference to certain embodiments thereof, it will be understood by those skilled in the art that various changes in form and detail may be made therein without departing form the spirit and scope of the invention as defined by the appended claims.

What is claimed is:

1. A method for transmitting content by a source device in a wireless fidelity display (WFD) network, the method comprising the steps of:
   receiving, by the source device, capability information and a display context from a sink device;
   identifying, by the source device, a usage environment of the sink device based on the display context;
   determining at least one parameter for the sink device based on the identified usage environment;
   identifying, by the source device, a display capability that is supported by the sink device, based on the capability information;
   determining, by the source device, whether a display coordinates feature is supported by the sink device based on the display capability; and
   transmitting, by the source device, to the sink device, the determined at least one parameter, display coordinates and the content being displayed on a screen of the source device, in either landscape or portrait orientation based on the display capability, in response to determining that the display coordinates feature is supported by the sink device,
   wherein the display capability includes information indicating that the sink device is capable of receiving portrait or landscape content,
   wherein the display coordinates indicate at least one section of a plurality of sections on the screen of the source device, wherein a part of the content displayed on the at least one section on the screen of the source device is displayed on a screen of the sink device, based on the display coordinates received by the sink device from the source device, wherein the determined at least one parameter is used to control a play of the content on the sink device, wherein the source device does not transmit the information about the determined at least one parameter, the display coordinates and the content being displayed on the screen of the source device, in response to determining that the display coordinates feature is not supported by the sink device, wherein the at least one parameter determined by the source device is further used to control an audio level of the sink device, and wherein the information related to the usage environment of the sink device includes location information of the sink device and user information of the sink device.

2. The method of claim 1, wherein the determined at least one parameter is further used to control an audio level of the sink device, wherein the display context includes the location information of the sink device and the user information of the sink device, and wherein the display coordinates are one of single coordinates including a start coordinate and an end coordinate, and a set of multiple coordinates including a plurality of single coordinates.

3. The method of claim 1, wherein receiving the capability information comprises:

establishing, by the source device, a communication session between the source device and the sink device; and receiving, by the source device, the capability information from the sink device based on the established communication session.

4. The method of claim 1, further comprising:

receiving, by the source device, from the sink device, a request message that requests playing the content; and transmitting, by the source device, to the sink device, a response message for playing the content.

5. A source device in a wireless fidelity display (WFD) network, the source device comprising:

a transceiver configured to receive capability information and a display context from a sink device; and at least one processor configured to:
identify a usage environment of the sink device based on the display context,
determine at least one parameter for the sink device based on the identified usage environment;
identify a display capability that is supported by the sink device based on the capability information,
determine whether a display coordinates feature is supported by the sink device based on the display capability, and
control the transceiver to transmit, to the sink device, the determined at least one parameter, display coordinates and content being displayed on a screen of the source device, in either landscape or portrait orientation based on the display capability, in response to determining that the display coordinates feature is supported by the sink device, wherein the display capability includes information indicating that the sink device is capable of receiving portrait or landscape content, wherein the display coordinates indicate at least one section of a plurality of sections on the screen of the source device, wherein a part of the content displayed on the at least one section on the screen of the source device is displayed on a screen of the sink device-, based on the display coordinates received by the sink device from the source device, wherein the determined at least one parameter is used to control a play of the content on the sink device, wherein the source device does not transmit the information about the determined at least one parameter, the display coordinates and the content being displayed on the screen of the source device, in response to determining that the display coordinates feature is not supported by the sink device, wherein the at least one parameter determined by the source device is further used to control an audio level of the sink device, and wherein the information related to the usage environment of the sink device includes location information of the sink device and user information of the sink device.

6. The source device of claim 5, wherein the determined at least one parameter is further used to control an audio level of the sink device, wherein the display context includes the location information of the sink device and the user information of the sink device, and wherein the display coordinates are one of single coordinates including a start coordinate and an end coordinate, and a set of multiple coordinates including a plurality of single coordinates.

7. The source device of claim 5, wherein the at least one processor is further configured to control the transceiver to:

establish a communication session between the source device and the sink device, and receive the capability information from the sink device based on the established communication session.

8. The source device of claim 5, wherein the transceiver is further configured to receive, from the sink device, a request message that requests playing the content, and wherein the transceiver is further configured to transmit, to the sink device, a response message for playing the content.

9. A method for receiving content by a sink device in a wireless fidelity display (WFD) network, the method comprising the steps of:

transmitting, by the sink device, to a source device, a display context including information related to a usage environment of the sink device, and capability information for indicating a display capability of the sink device;

receiving, by the sink device, from the source device, at least one parameter determined by the source device based on the display context, display coordinates and the content being displayed on a screen of the source device, in either landscape or portrait orientation based on the capability information; and displaying, by the sink device, a part of the content on a screen of the sink device based on the display capability and the display coordinates, wherein the display capability includes information indicating that the sink device is capable of receiving portrait or landscape content, wherein the display coordinates indicate at least one section of a plurality of sections on the screen of the source device, wherein the part of the content displayed on the at least one section on the screen of the source device is displayed on the screen of the sink device, based on the display coordinates received by the sink device from the source device, wherein the at least one parameter determined by the source device is used to control a play of the content on the sink device, wherein the at least one parameter determined by the source device, the display coordinates and the content being displayed on the screen of the source device are transmitted from the source device to the sink device, when it is identified by the source device that a display coordinates feature is supported by the sink device, wherein the at least one parameter determined by the source device, the display coordinates and the content being displayed on the screen of the source device are not transmitted from the source device to the sink device, when it is identified by the source device that the display coordinates feature is not supported by the sink device, wherein the at least one parameter determined by the source device is further used to control an audio level of the sink device, and wherein the information related to the usage environment of the sink device includes location information of the sink device and user information of the sink device.

10. The method of claim 9,
wherein the display coordinates are one of single coordinates including a start coordinate and an end coordinate, and a set of multiple coordinates including a plurality of single coordinates.

11. The method of claim 9, wherein transmitting the capability information comprises:
establishing, by the sink device, a communication session between the source device and the sink device; and
transmitting, by the sink device, the capability information to the source device based on the established communication session.

12. The method of claim 9, further comprising:
transmitting, by the sink device, to the source device, a request message that requests playing the content; and
receiving, by the sink device, from the source device, a response message for playing the content.

13. A sink device in a wireless fidelity display (WFD) network, the sink device comprising:
a display;
a transceiver; and
a processor configured to:
control the transceiver to transmit, to a source device, a display context including information related to a usage environment of the sink device, and capability information for indicating a display capability of the sink device,
control the transceiver to receive, from the source device, at least one parameter determined by the source device based on the display context, display coordinates and content being displayed on a screen of the source device, in either landscape or portrait orientation based on the capability information, and
control the display to display a part of the content on a screen of the sink device based on the display capability and the display coordinates,
wherein the display capability includes information indicating that the sink device is capable of receiving portrait or landscape content,
wherein the display coordinates indicate at least one section of a plurality of sections on the screen of the source device,
wherein the part of the content displayed on the at least one section on the screen of the source device is displayed on the screen of the sink device as displayed on the screen of the source device, based on the display coordinates received by the sink device from the source device, wherein the at least one parameter determined by the source device is used to control a play of the content on the sink device, wherein the at least one parameter determined by the source device, the display coordinates and the content being displayed on the screen of the source device are transmitted from the source device to the sink device, when it is identified by the source device that a display coordinates feature is supported by the sink device, wherein the at least one parameter determined by the source device, the display coordinates and the content being displayed on the screen of the source device are not transmitted from the source device to the sink device, when it is identified by the source device that the display coordinates feature is not supported by the sink device, wherein the at least one parameter determined by the source device is further used to control an audio level of the sink device, and wherein the information related to the usage environment of the sink device includes location information of the sink device and user information of the sink device.

14. The sink device of claim 13,
wherein the display coordinates are one of single coordinates including a start coordinate and an end coordinate, and a set of multiple coordinates including a plurality of single coordinates.

15. The sink device of claim 13, wherein the at least one processor is further configured to control the transceiver to:
establish a communication session between the source device and the sink device, and
transmit the capability information to the source device based on the established communication session.

16. The sink device of claim 13, wherein the transceiver is further configured to transmit, to the source device, a request message that requests playing the content, and
wherein the transceiver is further configured to receive, from the source device, a response message for playing the content.

17. An article of manufacture for transmitting content by a source device in a wireless fidelity display (WFD) network, comprising a non-transitory machine readable medium containing one or more programs which when executed implement the steps of:
receiving capability information and a display context from a sink device;
identifying a usage environment of the sink device based on the display context,
determining at least one parameter for the sink device based on the identified usage environment;
identifying a display capability that is supported by the sink device based on the capability information;
determining whether a display coordinates feature is supported by the sink device based on the display capability; and
transmitting, to the sink device, the determined at least one parameter, display coordinates and the content being displayed on a screen of the source device, in either landscape of portrait orientation based on the display capability, in response to determining that the display coordinates feature is supported by the sink device, wherein the display capability includes information indicating that the sink device is capable of receiving portrait or landscape content, wherein the display coordinates indicate at least one section of a plurality of sections on the screen of the source device, wherein a part of the content displayed on the at least one section on the screen of the source device is displayed on a screen of the sink device, based on the display coordinates received by the sink device from the source device, wherein the determined at least one parameter is used to control a play of the content on the sink device, wherein the source device does not transmit the information about the determined at least one parameter, the display coordinates and the content being displayed on the screen of the source device, in response to determining that the display coordinates feature is not supported by the sink device, wherein the at least one parameter determined by the source device is further used to control an audio level of the sink device, and wherein the information related to the usage environment of the sink device includes location information of the sink device and user information of the sink device.

18. An article of manufacture for receiving content by a sink device in a wireless fidelity display (WFD) network, comprising a non-transitory machine readable medium containing one or more programs which when executed implement the steps of:

transmitting, to a source device, a display context including information related to a usage environment of the sink device, and capability information for indicating a display capability of the sink device;

receiving, from the source device, at least one parameter determined by the source device based on the display context, display coordinates and the content being displayed on a screen of the source device, in either landscape or portrait orientation based on the capability information; and displaying, by the sink device, a part of the content on a screen of the sink device based on the display capability and the display coordinates, wherein the display capability includes information indicating that the sink device is capable of receiving portrait or landscape content, wherein the display coordinates indicate at least one section of a plurality of sections on the screen of the source device, wherein the part of the content displayed on the at least one section on the screen of the source device is displayed on the screen of the sink device, based on the display coordinates received by the sink device from the source device, wherein the at least one parameter determined by the source device is used to control a play of the content on the sink device, wherein the at least one parameter determined by the source device, the display coordinates and the content being displayed on the screen of the source device are transmitted from the source device to the sink device, when it is identified by the source device that a display coordinates feature is supported by the sink device, wherein the at least one parameter determined by the source device, the display coordinates and the content being displayed on the screen of the source device are not transmitted from the source device to the sink device, when it is identified by the source device that the display coordinates feature is not supported by the sink device, wherein the at least one parameter determined by the source device is further used to control an audio level of the sink device, and wherein the information related to the usage environment of the sink device includes location information of the sink device and user information of the sink device.

19. The article of manufacture of claim 17, wherein the determined at least one parameter is further used to control an audio level of the sink device, and wherein the display context includes location information of the sink device and user information of the sink device.

* * * * *